United States Patent Office 2,833,734
Patented May 6, 1958

2,833,734

STABILIZED ISOOLEFIN POLYOLEFIN INTERPOLYMER DERIVATIVES AND METHOD OF PRODUCING SAME

Richard T. Morrissey, Cuyahoga Falls, Ohio, and Henry J. Weiss, Joliet, Ill., assignors to The B. F. Goodrich Company, New York, N. Y., a corporation of New York No Drawing. Application October 29, 1953
Serial No. 389,143

3 Claims. (Cl. 260—23.7)

The present invention relates to the stabilization of isoolefin polyolefin interpolymer derivatives and, in particular, to compositions comprising a rubbery brominated or bromine-containing interpolymer of an isoolefin hydrocarbon and a polyolefin hydrocarbon, together with an expoxidized fatty acid ester stabilizer therefor, and to method of producing such compositions.

Among the known synthetic rubbers are the solid plastic interpolymers of a major proportion of an isoolefin such as isobutylene and a minor proportion of one or more polyolefins (that is, diolefins, triolefins or other olefins containing more than one double bond), which interpolymers are characterized by high molecular weight, low unsaturation and reactivity (vulcanization or curing) with sulfur to yield an elastic product. Such interpolymers are described in U. S. patents including Nos. 2,322,073; 2,356,128; 2,356,129; 2,356,130; 2,373,706; 2,384,975; 2,418,912 and 2,568,656 and 2,628,955. The presently best known examples of such interpolymers are the copolymers of isobutylene with a small proportion of isoprene or butadiene known to the rubber industry as Butyl (or GR–I) rubber.

While Butyl rubber has found considerable use in the manufacture of inner tubes, it possesses inherent disadvantages which have prevented its more widespread use. It vulcanizes or cures more slowly than other widely used sulfur-vulcanizable rubbery materials, it does not adhere well to other materials including natural rubber, and when it is mixed with natural rubber and the mixture vulcanized the resulting vulcanizates are generally less valuable than vulcanizates from either of the rubbery materials alone.

It is disclosed in U. S. Patent 2,631,984 that the introduction of bromine atoms into the polymer structure of "Butyl" rubber and similar isoolefin-polyolefin interpolymers, so as to produce units of the structure

as by bromination of such interpolymers, results in new materials with properties unexpectedly superior to those of the bromine-free materials. Such brominated rubbery isoolefin-polyolefin interpolymers cure or vulcanize quite rapidly even with vulcanizing agents which are totally ineffective with the unbrominated materials, to yield vulcanized products which far surpass those obtained from the unbrominated materials in a number of respects. In addition, the brominated interpolymers, unlike the unbrominated materials, adhere well to a wide variety of materials including metals, plastics, and natural and synthetic rubbers. They are, therefore, of considerable value as adhesives. They may also be mixed with natural rubber or any of the various known butadiene synthetic rubbers in any desired proportions and the resulting mixtures co-vulcanized to give products of excellent properties.

It has been found, however, that the rubbery brominated isoolefin polyolefin interpolymers are per se somewhat unstable as evidenced by their development of color upon heat aging or upon long standing at room temperature and by their becoming progressively tougher during storage or heat aging or during the Mooney viscosity determination. Their lack of stability also sometimes results in progressive degradation of their vulcanizates, during extended exposure to heat, in such physical and chemical properties as tensile strength, elongation, modulus, flex-life, ozone resistance, and adhesiveness. The copending application of Richard A. Crawford and Richard T. Morrissey, Serial No. 308,167, filed September 5, 1952, now U. S. Patent 2,681,899, discloses that certain metal silicates are stabilizers for brominated isoolefin polyolefin interpolymers.

The invention of this application resides in the discovery that such brominated isoolefin polyolefin interpolymers may be efficiently stabilized against such undesirable changes by incorporating therein a small amount of an epoxidized fatty acid ester of a class to be hereinafter defined. The resulting stabilized composition has the properties of the original brominated interpolymer and in addition is sufficiently stable to withstand prolonged storage and exposure to heat and light and other deleterious influences. Vulcanizates prepared from the stabilizer-containing compositions are likewise of superior stability to heat.

The epoxidized fatty acid esters of this invention are preferably epoxy oleic and linoleic acid esters. A useful product for the purposes of this invention is obtained, for example, by epoxidizing cotton seed oil which contains oleic and linoleic glycerides. Other useful fatty acid esters include esters of unsaturated linolenic, elaeostearic, ricinoleic and like acids with alcohols, diols, triols, and the like. The fatty acids of the esters preferably contain from 16 to 22 carbon atoms and at least one unsaturated carbon-to-carbon double bond. The esters and polyesters of the fatty acids include esters of the aliphatic alcohols containing more than three carbon atoms, and preferably from 5 to 10 carbon atoms, polyhydric alcohols such as the diols containing 2 to 10 carbon atoms represented by ethylene glycol, butanediol, tetraethylene glycol, diethylene glycol and the like, and triols such as glycerin and the like. A convenient source of the fatty acid esters are the naturally occurring unsaturated oils such as the vegetable oils: cotton seed, castor olive, peanut, corn, soya, tung, linseed and the like; fish oils; animal fats and the like. These oils ordinarily contain oleic, linoleic, linolenic, and/or elaeostearic acid esters. The epoxidized fatty acid esters may be prepared, for example, by treating one of the vegetable oils or the equivalent pure chemical product with aliphatic per-acids as described in U. S. Patent 2,567,930, or the method of U. S. Patent 2,485,160 whereby the epoxidation reaction is carried out by treating the ester with a mixture of hydrogen peroxide and formic acid. In any event the unsaturated carbon-to-carbon double bond is changed to an epoxy group

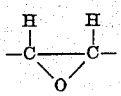

The epoxidized fatty acid esters preferably contain about one epoxy group per mol of fatty acid. The product employed as the stabilizer in this invention may contain as low as one-half equivalent epoxy group per mol of acid to complete saturation of the double bonds in the fatty acid molecule with epoxy groups. For example, if a linolenic acid ester is employed, there may be as low as one epoxy group for 2 molecules of the acid, or there may be three epoxy groups per molecule of acid since linolenic acid contains three unsaturated double bond groups. The preferred epoxy fatty acid esters for use in the practice of this invention are esters of oleic and linoleic acid with glycerol, glycols containing 2 to 4 carbons atoms and aliphatic alcohols containing 5 to 10 carbon atoms, said epoxidized fatty acid ester to contain at least ½ mol of epoxy group per mol of fatty acid.

The epoxidized fatty acid ester stabilizer may be incorporated into the brominated interpolymer at any time before vulcanization although it is preferred to incorporate the stabilizer as an integral step in manufacture of the brominated interpolymer. If incorporated into the solid brominated interpolymer, this may be done satisfactorily on a two-roll rubber mill or in a Banbury or other internal mixer or by dissolving or dispersing the brominated interpolymer in an appropriate medium and adding the stabilizer thereto. The preferred method is to blend the stabilizer with a solution containing the brominated interpolymer as obtained from the bromination process and to effect coprecipitation of the brominated interpolymer and the stabilizer in the form of discrete particles in which the latter is uniformly dispersed in the former. The exact manner in which the preferred incorporation step is carried out will be more fully described below.

The amount of the epoxidized fatty acid ester stabilizer required for efficient stabilization will vary somewhat depending on the interpolymer treated and on its bromine content, on the epoxidized fatty acid ester utilized and on its compatability with the rubber. In general, significant stabilization is noted, in amounts as little as 0.5 to 1% by weight based on the rubbery interpolymer. The beneficial effect increases with increasing amounts of stabilizer up to about 20%. For stabilization only, however, amounts of 1 or 2 to 5% are preferred. Amounts up to 15 to 20 volumes or more of stabilizing per 100 volumes of bromine-containing interpolymer or from 1 to 100% by weight or more may be utilized.

The brominated isoolefin-polyolefin interpolymers in which the stabilizer is incorporated are prepared, according to a preferred procedure described in U. S. Patent No. 2,631,984 by reacting a rubbery isoolefin polyolefin hydrocarbon interpolymer with a brominating agent, preferably in solution. Since the reaction which occurs involves an addition of bromine to olefinic double bonds, the isoolefin polyolefin interpolymer used must and will, of course, contain olefinic unsaturation, but its nature may otherwise be varied widely.

Preferred isoolefin polyolefin interpolymers for use in preparing brominated derivatives are the solid, plastic rubbery interpolymers (in other words, high molecular weight polymers) of a major proportion, more desirably from 70 to 99% by weight, of an isoolefin generally containing from 4 to 8 carbon atoms and a terminal methylene group, such as, most desirably, isobutylene or, alternatively, 3-methyl butene-1, 4-methyl pentene-1, 2-ethyl butene-1, 4-ethyl pentene-1, 4-ethyl hexene-1 or the like, or a mixture of such isoolefins, with a minor proportion, desirably from 1 to 30% by weight of a polyolefinic hydrocarbon generally containing from 4 to 18 carbon atoms, or two, three or more such polyolefinic hydrocarbons, including the following:

(1) Acyclic diolefins or open-chain, aliphatic conjugated dienes such as butadiene-1,3, isoprene, 2,4-dimethyl butadiene-1,3, piperylene, 3-methyl pentadiene-1,3, hexadiene-2,4, 2-neopentyl-butadiene-1,3 and the like;

(2) Acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom;

(3) Alicyclic diolefins, both conjugated and non-conjugated, such as cyclopentadiene, cyclohexadiene, 1-vinyl cyclohexene-3, 1-vinyl cyclohexene-1, 1-vinyl cyclopentene-1, 1-vinyl cyclobutene-2, dicyclopentadiene, and the like as well as monocyclic diolefinic terpenes such as dipentene, terpinenes, terpinolene, phellandrenes, syslvestrene and the like;

(4) Acyclic triolefins such as 2,6-dimethyl-4-methyleneheptadiene-2,5, 2-methyl hexatriene-1,3,5 and other conjugated triolefins, as well as myrcene, ocimene, alloocimene and the like;

(5) Alicyclic triolefins such as fulvene, 6,6-dimethyl fulvene, 6,6-methyl-ethyl fulvene, 6-ethyl fulvene, 6,6-diphenyl fulvene, 6-phenyl fulvene and other fulvenes of the formula

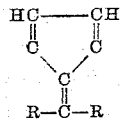

where R is hydrogen, alkyl, cycloalkyl, or aryl; as well as other alicyclic triolefins such as 1,3,3-trimethyl-6-vinyl cyclohexadiene 2,4, cycloheptatriene, etc.;

(6) Higher polyolefins such as 6,6-vinyl methyl fulvene (a tetraolefin) and 6,6-diisopropenyl fulvene (a pentaolefin), and (7) Aromatic hydrocarbons containing a plurality of olefinically unsaturated non-aromatic hydrocarbon groups such as vinyl groups, representative of which are divinyl benzene and similar polyvinyl or polyisopropenyl aromatic hydrocarbons.

Such solid, plastic, rubbery interpolymers, for use in preparing brominated derivatives, are themselves generally prepared by low temperature polymerization (from 0° to —165° C.) utilizing an appropriate catalyst, generally an active metal halide or Friedel-Crafts type catalyst such as aluminum chloride or boron trifluoride, dissolved in a low freezing solvent such as methyl or ethyl chloride, and, when so prepared, generally possess an average molecular weight above 15,000 and as high as 30,000 to 200,000 or higher, iodine numbers in the range 0.5 to 50, and are reactive with sulfur to yield elastic products. Most important of these are the solid plastic interpolymers of isobutylene with small amounts of isoprene or butadiene, of the type known as "Butyl" or "GR–I" rubber.

However, it is to be understood that the epoxidized fatty acid ester stabilizers are equally effective when applied to brominated interpolymers made from isoolefin polyolefin interpolymers other than the preferred materials set forth above. Any of the known isoolefin polyolefin hydrocarbon interpolymers may be converted to useful brominated derivatives and utilized in the method of this invention. For example, resinous interpolymers of low molecular weight and/or not readily vulcanizable with sulfur are readily converted to brominated derivatives having enhanced adhesive properties and the ability to be utilized advantageously in the compounding of rubbery materials. Similarly, isoolefin polyolefin hydrocarbon interpolymers containing other interpolymerized monomers such as styrene, chlorostyrenes, acrylyl chloride, methallylchloride, and other monoolefinic monomers also are advantageously utilized to prepare brominated derivatives. To illustrate, a brominated interpolymer of 50 percent isobutylene, 30 percent styrene and 20 percent isoprene is superior to the corresponding unbrominated interpolymer as an adhesive and in the compounding of rubbery materials.

In preparing the brominated derivatives for use in this invention, any brominating agent may be utilized such as molecular bromine itself or the compounds of bromine which liberate molecular bromine among which are sodium hypobromite, magnesium bromide hexahydrate, N-bromo-succinimide, alpha-bromo-acetoacetanilide, beta-bromoethyl phthalimide, N-bromoacetamide, tribromo phenol bromide, bromo-beta-naphthol, pyridinium bromide perbromide, etc.

In accordance with the disclosure of U. S. Patent No. 2,631,984 the bromination may be carried out in many ways. One method consists in preparing a solution, dispersion or cement of the interpolymer in an appropriate normally liquid organic solvent or diluent such as a hydrocarbon or halogenated derivative thereof (examples of which are toluene, chlorobenzene, hexane, heptane, trichloroethane, carbon tetrachloride, etc.) and adding the brominating agent either as such or in solution, for example, in carbon tetrachloride, to the resulting interpolymer solution, dispersion or cement thereby to form the brominated interpolymer in solution or dispersion in the solvent or diluent. The resulting solution or dispersion may be utilized as such, as for example, when the brominated derivative is employed as an adhesive, or it may be admixed with a non-solvent for the brominated derivative (such as alcohol or water) to precipitate the brominated derivative which is then recovered in the solid, finely-divided or crumb-like form, in either of which cases it is preferred that the stabilizer be incorporated in the solution or dispersion of brominated interpolymer before utilizing the latter as an adhesive or before precipitation thereof.

A more preferred method, particularly advantageous to those having "Butyl" type polymerization equipment consists in utilizing as the solvent or diluent for the bromination a saturated hydrocarbon or halogenated derivative thereof which boils below room temperature such as butane, methyl or ethyl chloride, and carrying out the bromination at a temperature and pressure such that the solvent is maintained in the liquid state. This greatly simplifies recovery of the solvent or diluent since the resulting solution of brominated interpolymer can be run into water above the boiling point of the solvent or diluent so that the latter is flashed off and condensed while the brominated interpolymer is precipitated or coagulated in a conveniently handled crumb-like form. The ethyl chloride solution of interpolymer utilized in this variation of the process is conveniently prepared by dissolving the solid interpolymer in the solvent. Preferably, the ethyl chloride solution resulting from the "Butyl" type polymerization may be utilized directly with addition thereto of a solution of bromine in ethyl chloride or carbon tetrachloride followed by quenching with an alkaline material which results in neutralization of excess bromine.

Another method of preparing brominated interpolymers consists in passing bromine vapors over a finely-divided or shredded solid interpolymer. Still another method, also applicable to solid interpolymers, resides in adding a solid brominating agent to the interpolymer on a mixing mill, Banbury or internal mixer, followed by heating the mixture to a temperature above that at which the brominating agent decomposes to liberate molecular bromine.

Regardless of the particular method employed for effecting the bromination, it has been found that the brominating reaction occurs quite rapidly and essentially involves the addition of bromine to the olefinic double bonds of the interpolymer. Consequently, the resulting bromine-containing interpolymers possess in their structure units of the formula

These units, not found in known isoolefin polyolefin hydrocarbon interpolymers, may well be responsible, at least in part, for the unique properties of the bromine-containing interpolymers. It should be pointed out, however, that some substitution may and probably does occur, along with addition of bromine to olefinic double bonds, during the bromination reaction, and that, therefore it is not essential that all combined bromine be present in the

structure.

The amount of bromine which combines with the interpolymer during bromination depends upon the brominating agent being used, the method of bromination and the concentration of brominating agent. When other factors are constant under the preferred conditions there appears to be an approximate straight line relationship between the original concentration of available bromine and the amount of bromine combined with the interpolymer. In general, the amount of combined bromine is about ⅕ to ⅗ that of the original concentration of bromine.

The brominated interpolymers resulting from the bromination reaction may contain from as little as 0.5 percent by weight or 4, 8, 10 or even 15 percent by weight, or even as much as 50 percent by weight of combined bromine depending on the degree of unsaturation of the parent interpolymer, which in turn depends upon the proportion of combined polyolefin in the interpolymer utilized. Preferably, for any given derivative, the percentage of combined bromine is less than that which would theoretically be present if all the olefinic ($>C=C<$ units) double bonds were completely brominated to give

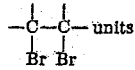

and preferably, for high molecular weight rubbery isoolefin polyolefin interpolymers having an iodine number less than 50, that is of the nature of butyl rubber, the percentage of combined bromine is from 20 to 80 percent of the possible theoretical amount. Still more preferably, the percentage of combined bromine in such interpolymers is in the range of 1 to 8 percent by weight, and for adhesive applications is in the range of 1.5 to 4 percent by weight. Most useful brominated interpolymers are those derived from butyl rubber in which the percentage of combined bromine is 40 to 60 percent of theoretical or 2.5 to 4.5 percent by weight or, more particularly, about 3 percent by weight.

From the foregoing, it is apparent that the preferred brominated interpolymer derivatives for use in this invention are not completely saturated but that they are less unsaturated than the parent unbrominated interpolymers. Their molecular weights are not precisely known, but they are of the same order as the parent interpolymer. Even though some depolymerization may occur during bromination their "apparent" molecular weights are generally about the same or slightly higher because of the presence of the relatively heavy bromine atoms.

Bromination of isoolefin polyolefin interpolymers so as to produce

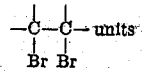

is not the only method of arriving at interpolymers containing such units, but is at present preferred. Another method consists in interpolymerizing an isoolefinic monomer with a polyolefinic monomer at least one of which monomers is brominated so as to contain the

structure. For example, the interpolymerization of isobutylene with 2,3-dibromo-butadiene-1,3—which has the

unit in its structure of

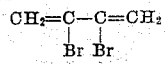

results in the production of an interpolymer containing such units; this interpolymer, however, is more unsaturated for a given bromine content than are the bromine-containing interpolymers produced by the bromination of isoolefin diolefin interpolymers.

As mentioned above, the bromine-containing isoolefin polyolefin interpolymers are possessed of unique properties in and of themselves and when stabilized according to this invention, are exceedingly useful, especially in adhesives, in the manufacture of inner tubes, tire-curing bags, etc. (where great heat stability, resistance to air diffusion, oxygen, steam, water, ozone, etc. are required) and for various other purposes of particular importance in manufacture of tires and a multitude of other rubber products, in which the unbrominated isoolefin polyolefin interpolymers are not entirely satisfactory. For example, the stabilized brominated interpolymers of this invention, without further addition of compounding ingredients, are excellent adhesives to bond rubbery materials to each other or to metal and other structural materials, being especially useful in bonding the unbrominated isoolefin polyolefin interpolymers to each other, to natural rubber and to diene synthetic rubbers. The stabilized bromine-containing interpolymers are compatible in all proportions with the natural and diene synthetic rubbers forming vulcanizable admixtures therewith which possess the desirable properties of remarkably increased ozone resistance, improved resistance to flexing, and increased resistance to air diffusion. In any of these uses they may be compounded with any of the conventional ingredients used in compounding the unbrominated rubbery isoolefin polyolefin interpolymers or other rubbery materials, and they may be vulcanized by the same general methods. Their vulcanization proceeds much more rapidly than that of the unbrominated materials, despite their generally lower degree of unsaturation, and they may be vulcanized in the absence of sulfur with agents, such as the polyvalent metal oxides particularly zinc oxide, which are ineffective in vulcanizing the parent unbrominated interpolymer.

The preparation of representative bromine-containing interpolymers and their stabilization according to this invention are more fully set forth in the following examples which are illustrative only since numerous variations and modifications therein will be apparent to those skilled in the art. In the examples, all parts, unless otherwise indicated, are by weight.

EXAMPLE I 91 parts of a solid plastic rubbery copolymer of about 97 percent isobutylene and 3 percent isoprene known as "Butyl" or "GR–I–15" is dissolved in sufficient n-heptane to form a fluid solution, 9 parts of liquid bromine as a 10 percent solution in carbon tetrachloride are then added to the heptane solution and the resulting mixture stirred for about one hour in the dark. An excess of sodium carbonate as a 10 to 30 percent solution in water is then added to neutralize the unreacted bromine. After a short period of agitation the neutralized brominated cement is blended with a quantity of methanol to precipitate the brominated copolymer, the latter then being filtered, washed and dried. The brominated copolymer thus obtained contains 2.25 percent of combined bromine and is slightly softer than the parent copolymer.

The copolymer when vulcanized by sulfur either alone or in blends with natural rubber or with butadiene-styrene or butadiene-acrylonitrile synthetic rubber forms strong, highly useful compositions. However, when the raw brominated copolymer is allowed to stand in air at 70° C. it becomes tough, in fact in three days it becomes so tough as to be somewhat difficult to process. This toughening, without substantial change in bromine content, is illustrated by the following data for the raw brominated copolymer, after aging, as to its bromine content and Mooney viscosity at 1 minute, 10 minutes, and 20 minutes using the 1.2 inch rotor at 250° F.:

| Days Aged at 70° C. | Bromine Content, Percent | Mooney Viscosity | | |
|---|---|---|---|---|
| | | M 1' | M 10' | M 20' |
| 0 | 2.25 | 63 | 78 | 81 |
| 1 | 2.18 | 85 | 104 | 104 |
| 2 | 2.04 | 110 | 120 | 112 |
| 3 | 2.23 | 128 | 115 | 110 |

The physical properties of vulcanizates of the brominated copolymer also deteriorate during aging at 70° C., the tensile strength of a sulfur vulcanizate of an unaged sample of brominated copolymer in a 60/40 blend with natural rubber being 1775 lbs. per square inch, while that of a similar blend containing a brominated copolymer aged 3 days at 70° C. is considerably less.

The unstabilized brominated copolymer also increases in Mooney viscosity during a Mooney viscosity determination. After an initial reading of 21, a stock containing such copolymer evidences a Mooney viscosity of 37 after 1 minute and 47 after 15 minutes at 250° F. When aged for seven days at 70° C. the same stock is of a dark color and evidences an initial Mooney reading of 51, a 1 minute Mooney of 76 and a 15 minute Mooney of 72.5. By contrast when only 1.25 percent, based on the brominated copolymer, of an epoxidized cotton seed oil which is a glyceride of oleic and linoleic acids and which contains about one epoxide group per mol of acid is milled into the brominated copolymer, the resulting composition is light in color, has a 1 minute Mooney of 36 and a 15 minute Mooney of 20. After aging for seven days at 70° C. the stock is a very light buff in color and has a 1 minute Mooney of 38. Thus, only 1.25 percent of the epoxidized fatty acid ester is sufficient to stabilize the brominated copolymer during processing and to prevent blackening of the stock, not only during processing but also during an accelerated 7 day heat aging.

The incorporation of an epoxidized fatty acid ester into the brominated isoolefin polyolefin interpolymer not only stabilizes the latter against heat-induced changes in plasticity and color during processing and storage but also has a very beneficial effect on the physical properties of vulcanized compositions prepared therefrom. Separate samples of the unstabilized brominated copolymer described above, both aged and unaged, and an aged sample of the stabilizer composition containing 1.25 percent epoxidized fatty acid ester are compounded with natural rubber and the usual sulfur vulcanization ingredients to form a white sidewall tire compound as follows:

| | Parts by weight |
|---|---|
| Brominated copolymer | 60.0 |
| Natural rubber | 40.0 |
| Zinc oxide | 87.0 |
| Ultramarine Blue | 0.2 |
| Titanium dioxide | 14.0 |
| Stearic acid | 1.5 |
| Mercaptobenzothiazole | 0.75 |
| Di-orthotolyl guanidine | 0.25 |
| Sulfur | 2.50 |

When portions of each composition are vulcanized at 280° F. for varying periods of time the physical properties of the vulcanizates are as shown in the following Table I:

| Cure, Minutes at 280° F. | Unaged—Unstabilized | | Aged—7 days at 70° C., Unstabilized | | Aged—7 days at 70° C., 1.5% Stabilizer | |
|---|---|---|---|---|---|---|
| | Tensile Strength, p. s. i. | Elongation, percent | Tensile Strength, p. s. i. | Elongation, percent | Tensile Strength, p. s. i. | Elongation, percent |
| 15 | 1,750 | 775 | 1,100 | 620 | 1,500 | 800 |
| 30 | 1,600 | 700 | 1,200 | 590 | 1,800 | 770 |
| 45 | 1,750 | 705 | 1,200 | 595 | 1,400 | 655 |

Inspection of the data in Table I clearly shows that without stabilizer, aging for 7 days in air at 70° C. results in a lowering of the physical properties of the white side wall tire compound while with only 1.5 percent by weight of the epoxidized fatty acid ester, the physical properties are substantially unaffected. The composition containing stabilizer also seems to have a faster cure rate than the aged unstabilized composition. The aged stabilizer containing composition, moreover, was very white in color while the aged-unstabilized vulcanizate was a creamy buff. Similar results are noted with amounts of stabilizer ranging from 1 to 10 percent or more and with equivalent amounts of other epoxidized fatty acid esters.

EXAMPLE II

The isobutylene-isoprene copolymer utilized in the bromination step of Example I is dissolved in liquid ethyl chloride to form a 20 percent solution containing 100 parts of copolymer. A solution containing 5 to 16 parts of bromine dissolved in ethyl chloride is added to the copolymer in a closed vessel and the resulting mixture stirred for five minutes at which point an excess of alcoholic potassium hydroxide is added to neutralize the unreacted bromine. After stirring for several minutes to allow neutralization to be completed, an ethyl chloride solution of epoxidized cottonseed oil (2 percent based on the weight of brominated copolymer) is added and the mixture stirred rapidly. Following further stirring to form a substantially homogeneous mixture the contents of the reaction vessel are discharged in a fine stream or spray into a closed coagulating tank fitted with a condenser and containing hot water (60-70° C.) and a colloidal dispersing agent of zinc stearate, whereupon the ethyl chloride is flashed off and condensed and the brominated copolymer is obtained as a fine crumb-like coagulum. The presence of zinc stearate in the copolymer solution and in the coagulation bath assists in obtaining a fine, small sized and non-sticky crumb. The coagulum is finally separated by filtering and is washed once or twice with clear water and dried.

The brominated isobutylene-isoprene copolymer containing the epoxidized fatty acid ester thus obtained contains from 1.5 to 6.0 percent of combined bromine (depending on the original amount of bromine used) and is a plastic, easily worked rubbery material having approximately the same Mooney viscosity as the parent copolymer. Compounded with sulfur and accelerators in the natural rubber white side wall tire compound of Example I and then vulcanized, the copolymer derivative containing 2.0 to 3.0 percent by weight of stabilizer exhibits 2,000 pounds per square inch tensile strength and is white in color. After aging the copolymer derivative in air for as much as 7 days at 70° C. the color or physical properties of its vulcanizates are substantially unchanged (1950 lbs./sq. in. tensile strength). When exposed to 27.9 p. p. h. m. of ozone at 280° F. while under 20 percent stretch the vulcanizate requires 167 hours to show the first crack while a similar vulcanizate prepared without stabilizer cracks in less than 100 hours. Similar excellent results are obtained when polymer containing 5.0 parts of stabilizer are employed.

EXAMPLE III

A brominated copolymer of the type shown in Example II is stabilized with 1.0 part of an epoxidized oleic acid ester of n-hexanol which contains about 1.0 epoxy group per mol of acid. This polymer is then compounded in the recipe of Example I and tested both before and after aging. The unaged example cured for 20 minutes at 292° F. has a tensile strength of 2725 pounds per square inch and an elongation of 525 percent. After aging 16 days at 70° F. the stabilized polymer has a tensile strength of 2500 pounds per square inch and an elongation of 425 percent demonstrating the outstanding stabilizing properties of this epoxidized fatty acid ester.

EXAMPLE IV

The previous examples have shown the effect of the epoxidized fatty acid ester stabilizers on 60/40 blends of the brominated isoolefin polyolefin polymers with natural rubber. Blends with natural rubber ranging from 5 to 95 percent of the bromine-containing polymer and 5 to 95 percent of natural rubber or natural rubber reclaim also are so stabilized. Similar stabilization effects are noted also in vulcanizates prepared from the bromine-containing polymers alone and in blends with other natural and synthetic rubbers and reclaimed forms of such rubbers. Specifically, blends ranging from 10 to 95 percent by weight of the bromine-containing isoolefin polyolefin polymer and 5 to 95 percent of butadiene acrylonitrile copolymer rubbers are similarly stabilized against discoloration in the raw polymer state and in the form of sulfur-vulcanizates are stabilized during heat-aging and are possessed of better hot-flexing and hot tensile properties. Also similar blends with butadiene styrene copolymer rubbers, polychloroprene rubbers, unbrominated "Butyl" rubbers, Thiokol-type rubbers and others are also efficiently stabilized by the epoxidized fatty acid esters.

EXAMPLE V

Other brominated isoolefin polyolefin hydrocarbon interpolymers show a similar response to the incorporation of the epoxidized fatty acid esters of this invention. For example, a copolymer of 90 to 97 percent isobutylene, 1 to 3 percent isoprene and 2 to 5 percent 6,6-dimethyl fulvene prepared by polymerization at about —100° C. in ethyl chloride using aluminum chloride catalyst and having a molecular weight of from 630,000 to 970,000 and an iodine value (by the Wijs method) of 2.5 to 10 is easily converted to brominated derivatives containing from 2 to 7 percent or more bromine. From 1 to 10 percent or more of the stabilizers protect this type of brominated copolymer in the same manner as is shown in the foregoing examples. Still other isoolefin polyolefin hydrocarbon interpolymers easily converted to brominated derivatives and stabilized by the stabilizers of this invention are interpolymers of isobutylene or another isoolefin with isoprene and/or 1 to 5 percent of cyclopentadiene, dicyclopentadiene, 1-vinyl cyclohexene-3, myrcene and others.

From the foregoing description of the invention, it will be seen that the stabilized bromine-containing interpolymer compositions constitute a new, greatly improved and widely useful class of materials. It is apparent, therefore, that various embodiments of the invention, in addition to those specifically disclosed, may be provided without departing from the spirit and scope of the invention as defined in the appended claims.

We claim:

1. A stabilized rubber composition comprising a partially brominated derivative of a rubbery interpolymer of from 70 to 99% by weight isobutylene and from 1 to 30% by weight of isoprene, said brominated derivative retaining residual olefinic unsaturation and containing about 1.5 to about 4% by weight combined bromine, and as a stabilizer therefor from about 1 to about 5% by weight of an epoxidized vegetable oil containing glycerides of oleic and linoleic acids having about 1 mol epoxy group per mol of esterified fatty acid in the vegetable oil.

2. The stabilized rubber composition of claim 1 wherein the stabilizer is epoxidized cotton seed oil containing about 1 mol epoxy group per mol of esterified fatty acid in the cotton seed oil.

3. The stabilized rubber composition of claim 2 wherein the rubbery interpolymer is an interpolymer of about 97% isobutylene and about 3% isoprene.

References Cited in the file of this patent

UNITED STATES PATENTS

| | | |
|---|---|---|
| 2,556,145 | Niederhauser | June 5, 1951 |
| 2,590,059 | Winkler | Mar. 18, 1952 |
| 2,669,549 | Darby | Feb. 16, 1954 |
| 2,720,479 | Crawford et al. | Oct. 11, 1955 |